March 3, 1942. R. ESNAULT-PELTERIE 2,274,734
CONTROL APPARATUS FOR LAND, MARINE, AND AERIAL VEHICLES
Filed May 27, 1939 9 Sheets-Sheet 1

INVENTOR
Robert Esnault-Pelterie
BY Kenyon & Kenyon
ATTORNEYS

Fig. 1B.

March 3, 1942. R. ESNAULT-PELTERIE 2,274,734
CONTROL APPARATUS FOR LAND, MARINE, AND AERIAL VEHICLES
Filed May 27, 1939 9 Sheets-Sheet 8

INVENTOR
Robert Esnault Pelterie
BY
Kenyon & Kenyon
ATTORNEYS

UNITED STATES PATENT OFFICE 2,274,734

CONTROL APPARATUS FOR LAND, MARINE, AND AERIAL VEHICLES

Robert Esnault-Pelterie, Boulogne-Billancourt, France, assignor to Spladis, Societe pour l'Application d'Inventions Scientifiques, a corporation of the Grand Duchy of Luxembourg Application May 27, 1939, Serial No. 276,249
In Switzerland May 30, 1938

13 Claims. (Cl. 60—52)

This invention relates to control apparatus for land, marine or aerial vehicles. It relates especially to control apparatus comprising a servo-power device which is brought into operation by operation of a manually operable part, the said servo-power device being arranged so as to actuate a control such as a rudder, aileron, elevator, guiding wheel, or the like for the vehicle.

Features and objects of this invention are:

The provision of servo-assisted control systems wherein a manually operable force applying device for actuating the control of the vehicle comprises a lost motion member adapted to actuate a servo-power device, and wherein there is substantial reduction, practically to the point of elimination, of the lost motion effect in the "neutral" position and in other positions, and wherein there is continuity and instantaneity of action of the relieving response, and in which the effort in the driven organ is constantly and substantially accurately proportional to the effort from the driver's hand on the manually operable force applying device.

The provision of servo-assisted systems employing an incompressible fluid working medium supplied by pumping means to the servo-power device, the supply of medium under pressure to said device being controlled by valve arrangements which tend to open under the pressure of the fluid and are acted upon in the closing direction by a force proportional to that exerted by the operator.

The provision of valve arrangements for effecting the control of the servo-power devices in the various systems embodying my invention, each operable by a single member in such manner that for even the smallest movements of a manually operable member, the response of the respective servo-system will be instantaneous and smoothly progressive.

The provision also of valve arrangements for systems particularly suited for control apparatus requiring great leverage, wherein the valves are partially balanced during operation so that a large flow of pressure medium may be effectively controlled without resort to inconvenient mechanical leverages.

The provision of systems in which the hydraulic pressure may be produced either by the same source of energy used for propulsion of the vehicle or, in the case of aircraft, may be produced by an aerodynamic motor independent of the aircraft engine so that servo-action will continue to be available even in the case of failure of the aircraft engine.

The provision in some systems and particularly for vehicles in which the control member is located at a considerable distance from the manually operable part, of a servo-power device arranged close to the control member and operated so that the extent of the structure of the vehicle subjected to loading by forces originating from the operation of the power device is reduced as much as possible, and wherein the operating medium may be supplied to the servo-power device through tubing forming part of the general framing of the vehicle.

The provision in some forms of my invention of servo-assisted systems employing two power sources and double complete power circuits.

The provision in some forms of my invention of double-acting servo-assisted control systems in which the employment of novel valve arrangements permits the use of a single fluid pump.

The provision, in some forms of my invention, of systems which, upon failure of the power supply, permit the operator automatically to continue to operate the respective systems manually, and in which, upon such failure, an increased gearing ratio becomes available automatically to avoid too great an increase in the forces required to be exerted by the operator, and in which the range of movement of a part of the respective manually operated force-applying devices may be increased.

The provision in such latter forms of the systems of automatic means which disconnect the respective servo-power device and respectively engage another organ in the proper position to effect the desired increased gearing ratio.

Additionally, among the objects of the invention are the provision of improved construction of elements of the systems and the provision of special gear train means for operating the various valve arrangements.

To the accomplishment of the foregoing and such other objects as may hereinafter appear, this invention comprises the novel construction and arrangement of parts hereinafter more fully described and then sought to be defined in the appended claims, reference being had to the accompanying drawings forming a part hereof and which show, merely for the purpose of illustrative disclosure, preferred embodiments of my invention, it being expressly understood, however, that various changes may be made in practice within the scope of the claims without digressing from my inventive idea.

In order to facilitate an understanding of certain embodiments of this invention, the lever mechanism indicated diagrammatically in Figure 1 of the annexed drawings will be explained. In the case of greater angular displacement, this lever could be replaced by trains of gears as will be seen later. A lever of the third class A B C (for example) is shown where the acting force, F is applied at the intermediate point B and the resistance R at the extremity C; the point of support A is slightly movable between two stops $a_1$, $a_2$. If the force F acts in the direction of the arrow $f_1$, the point A moves in the direction of the arrow $f_2$, and bears against the stop $a_2$. This lever thus represents a hinged device with limited lost motion. This small displacement of A is utilized according to certain embodiments of this invention, not represented on Figure 1, to control a mechanism which develops the added force M, acting in the same direction as F and thus diminishing the work to be done by the driver.

Naturally the lever could also be of the second class by inversion of the force and the resistance acting thereon and the force M could theoretically be applied elsewhere than at the point C, but for the preferred functioning of the system it is of advantage to apply it at C or in the vicinity thereof.

The abovementioned purposes, features and advantages of this invention and others as well will be apparent in connection with the following description of certain illustrative embodiments of this invention shown in the accompanying drawings, wherein.

Figures 3, 4, 5:
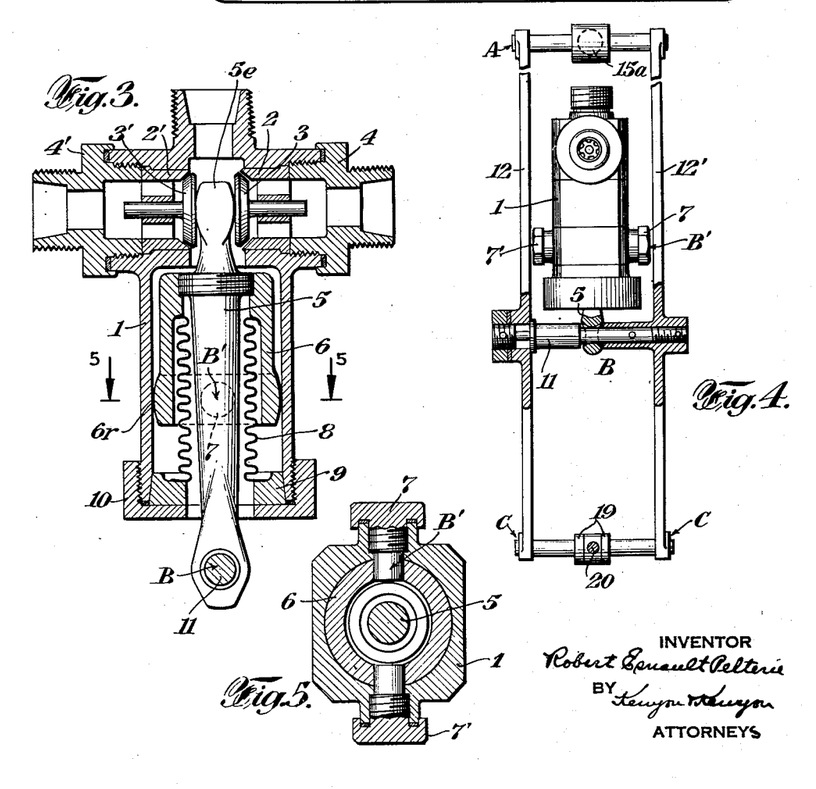
Figure 3 shows on a larger scale and in vertical section a relay valve device of the type shown in Figure 2.
Figure 4 shows the relay valve device in side elevation with partial section.
Figure 5 is a horizontal section of the relay device on the line 5—5 of Figure 3.

In Figures 2 to 8 there is shown the main parts of a control system for an aircraft which includes a servo-power device or booster and a relay valve device indicated generally by the reference character 13 and shown in greater detail in Figures 3, 4 and 5.

The relay device comprises a fixed T-shaped hollow body 1 enclosing in a transverse bore two valve seats 2 and 2' and two valve heads 3 and 3'. Two plugs 4 and 4' fix the valve seats in position and serve at the same time as connections for liquid conduits 51 and 51' respectively. The upper extremity 5e of a lever 5 engages with a slight clearance between the two valve heads 3 and 3'. This lever 5 through the intermediation of a socket 6 screwed and fitted on it, rocks about an axis $B_1$ formed by co-axial fixed journals 7 and 7' (Figure 5) supporting the socket 6. The socket 6 has its lower extremity made in spherical form 6r.

To obtain a perfectly tight joint and at the same time a good freedom of rocking of the lever 5 about the axis $B_1$, the socket 6 is soldered at the extremity of a flexible tube 8, the other extremity of which is soldered to a slightly frustum shaped part 9, itself fixed on the hollow body 1 by means of the nut 10.

The lever 5 carries pivotally at its lower extremity B a spindle 11 which itself is carried by the two twin levers 12 and 12' operated by the driver through the intermediation of a rod system as described below.

Figures 1, 2:
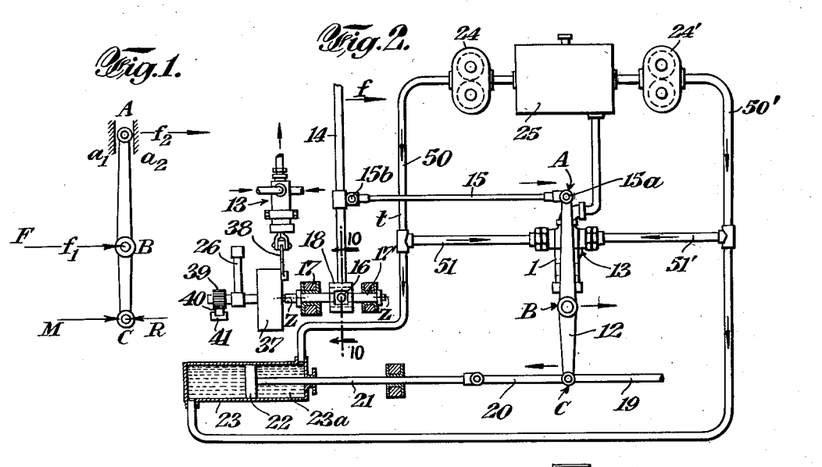
Figure 2 shows a schematic arrangement of a first embodiment in which the manual force is applied through levers.
Figures 6, 7, 8, 9, 10:
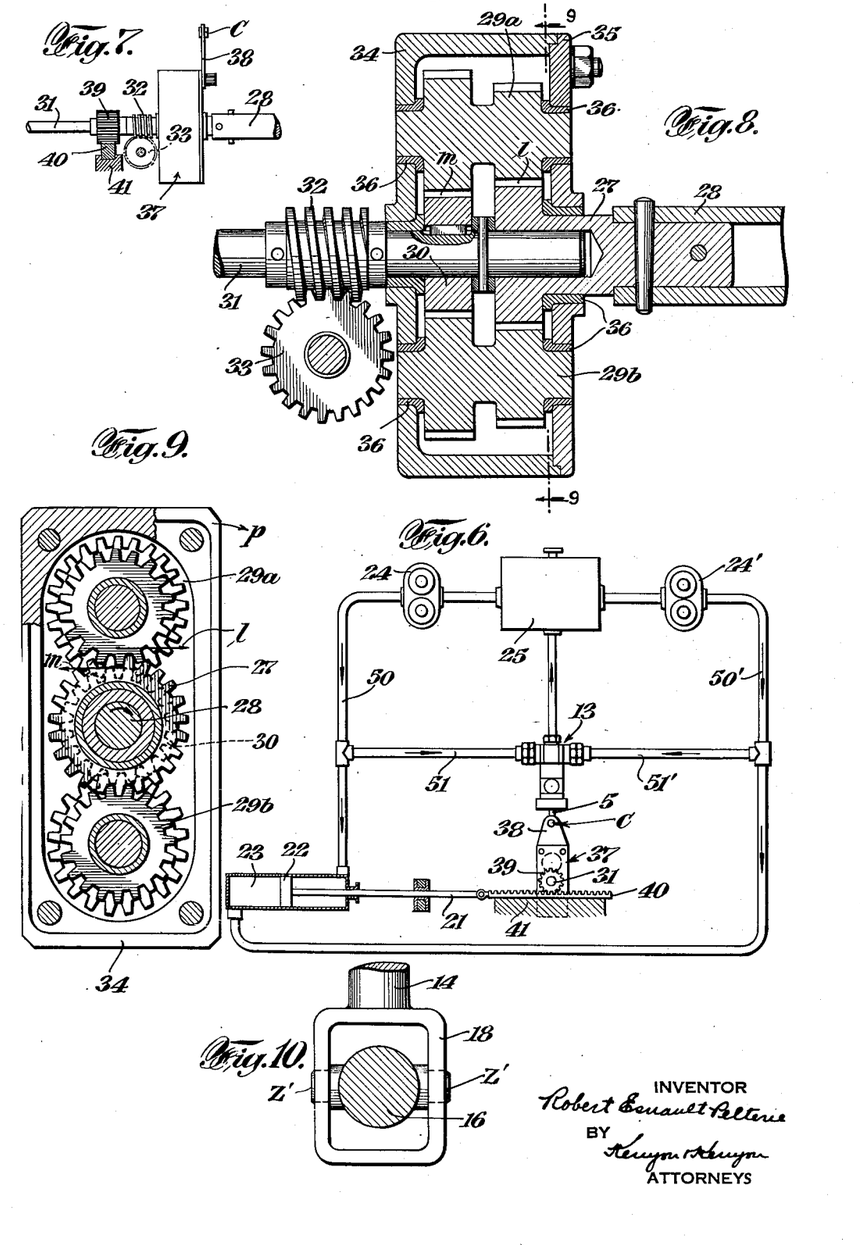
Figure 6 shows schematically a modification in which the manual force is applied through a gear-wheel device.
Figure 7 shows an external side view of the gear wheel device with parts appertaining thereto.
Figure 8 shows on a larger scale a vertical axial section of the gear wheel device.
Figure 9 is an end elevation of the gear-wheel device shown in Figures 6, 7 and 8.
Figure 10 is a detail sectional elevation of the joy-stick mounting on the line 10—10 of Figure 2.

The relay device indicated by 13 in Figure 2, is operated by the two twin levers 12 and 12' actuated themselves by the manually operable part 14 which in this embodiment of this invention is in the form of a joy-stick through the intermediation of a long connecting rod 15 having at each extremity a ball joint 15a and 15b respectively of slight angular displacement and connected to the upper extremities of the levers 12 and 12'. The joy-stick 14 is fixed at its base on a ball joint or cardan hinge composed as follows: a plug or core piece 16 has two perpendicular spindles Z and Z' of which one, Z, can rock in two fixed bearings 17 and 17'. On the other, Z', is hinged a socket 18 integral with the joy-stick 14 (Fig. 10). The latter can thus be manipulated in all directions about the crossing point of the two spindles Z and Z' which serves as the point of support. At the other extremity C thereof the twin levers 12 and 12' are hingedly connected to the rod 19 which controls the control member to be manipulated. The joy-stick, levers 12 and 12', and associated rods form a manually operable force applying system arranged to actuate a control for guiding the vehicle. The end C of the lever 12 is hingedly connected to the small connecting rod 20 which receives the action of the rod 21 of a piston 22. This piston 22 slides in a cylinder 23 filled with a non-compressible liquid under pressure, for example, oil. This liquid is supplied by two pumps 24 and 24' which draw it from a reservoir 25 and deliver it through conduits 50 and 50' on each side respectively of the piston 22 and at the same time to the valves 3 and 3' respectively of the device 13 through the transverse conduits 51 and 51', the pressure of the liquid on said valve tending to open them.

With the object of simplification, the diagram only represents the control for a single direction of manipulation of the joy-stick 14; that indicated by the arrow $f$ on Figure 2. For the manipulation in the perpendicular direction, the control can take place owing to a second relay device made in the form of a gear box 37, the description of which will be given below, mounted on the spindle Z of the core 16, which box through the intermediation of a relay device similar to 13 and another fluid circuit will act on the lever 26 which has to ensure the control in this direction, for example, the control of the transverse equilibrium of the aircraft.

The operation of the system is as follows:

The top of the joy-stick 14 (Figure 2) being presumed to be pushed toward the right in the direction of the arrow $f$, the hinge point A is itself displaced towards the right and by reason of the point C of the lever 12/12' bearing on the resistance which the control offers through the intermediation of the actuating rod 19, the point B also tends to move towards the right.

If Figure 3 be now referred to, it will be seen that the point B of the lever 5 being moved towards the right, the point of support presented by the spindle $B_1$ through the intermediation of the ball joint $6r$ thrusts its upper extremity $5e$ towards the left and causes it to press on the valve 3' and tend to move it against the pressure of liquid therein. The lever 5 constitutes a lost motion member in the manually operable force applying system.

The circulation of the pump 24 being thus impeded, the pressure increases in its delivery tube $t$ (50) and in the right-hand chamber 23$a$ of the cylinder 23. The rods 21 and 20 under the effect of this excess pressure draw the point C towards the left, thus adding their effort to that supplied by the pilot at the point A.

It is easily seen that if the output of the pumps 24 and 24' is not too great, and the valves 3 and 3' of sufficiently large area, the excess pressure in the conduit $t$ will be practically proportional to the pressure developed at the top $5e$ of the lever 5, that is to say, to the pressure developed by the pilot's hand on the lever 14. It will be the same with the additional force developed at the point C by the rod 20; that is, the amount of servo-power assisting the actuation of the control for the vehicle will be proportional to the manual force applied by the operator.

It will be sufficient to suitably proportion the surface of the valves 3 and 3' to the sections of the cylinder 23 to have the ratio which is desired between the forces at A and at C. By decreasing the size of valves 3 and 3' relatively to the piston 22 and servo effect can be increased, and vice versa, as may be desired.

If the size of the valve heads 3 and 3' is sufficiently large so that the lift of the control valves 3 and 3' is, as has been described, relatively small, the play of a few millimetres at the extremity of the lever $5e$ would not be capable of affecting the precision of the control by the pilot. The use of means whereby lost motion in the manually operable force applying system is minimized is a feature of this invention. To this end it is desirable to reduce sufficiently the distance between the points B, $B_1$, for minimizing the extent of the free motion at the manually operated member, and fit the head of valves 3, 3', with cylindrical extensions as it will be explained later.

Figures 6 to 9 show a modification in which the force exerted by the pilot is transmitted through a train of gears instead of a lever mechanism to a control member to be operated.

The gear mechanism 37 has already been referred to in connection with the aircraft control system shown in Figure 2 and the following description of the structure and operation thereof is applicable to such system. However, in order to further illustrate uses of which this invention may be put, this modification will be further described with reference to a system for steering a heavy automobile vehicle. It comprises a pinion 27 (Figures 8 and 9) which is integral with the shaft 28 operated by the driver, and controls, through the intermediation of two satellite pinions 29$a$ and 29$b$, each comprising two integral pinions of little different diameter, a second pinion 30 keyed on to the driven shaft 31. This shaft 31 carries the usual endless screw or worm 32 which, through the worm wheel 33 and appropriate intermediate members controls in the usual manner the direction of the automobile vehicle. All the toothed wheels referred to turn freely in a box 34 closed by a cover 35 and provided with bronze bearings 36 which could also be ball bearings. (In Fig. 2 the arm 26 takes the place of the worm 32 and worm wheel 33 and the shaft Z takes the place of the shaft 28.)

As shown by Figures 6 and 7, this box 34 carries rigid therewith a plate 38 forming a lever, by the intermediation of which it controls the valves of the relay device 13 described above, the plate 38 being hinged at the lower extremity of the lever 5 of the device 13. On the driven shaft 31 is keyed a pinion 39 which engages with a rack 40 sliding on a guide 41. The extremity of the rack is connected to the rod 21 of the piston 22, the cylinder 23 of which communicates through piping 50, 51' with pumps 24 and 25' respectively drawing from a reservoir 25, as already described.

In this embodiment, the operation takes place in the following manner (Figures 6 and 8).

The shaft 28 being moved in a particular direction by the driver, i. e., in the direction of the arrow on Figure 9, and the shaft 31 resisting this movement, the point of engagement $l$ tends to move towards the right, whilst the point $m$ forms resistance by developing an effort towards the left. There results a pivoting movement of the mechanism 37 (box 34) about the central axis (31—28) towards the right in the direction of the arrow $p$ of Figure 9 and a corresponding movement of the lever 5 of the device 13, the valves of which then function in the manner already described to permit fluid under pressure to act on one side of the piston 22 which then provides the additional force acting on the rack 40 and consequently on the steering mechanism of the automobile (or control of an aeroplane or the like).

It is easily understood that the examples which have been given are equivalent. The rocking lever and trains of gears play a similar role, the only difference being the amplitude of the angular movements obtainable.

The control system is above all intended for the application of high fluid pressures which permit the metal of the conduits to be stressed more and thus reduce the weight of the whole of the system. This advantage which is essential for aircraft, is likewise very appreciable for motor vehicles.

Figure 11:
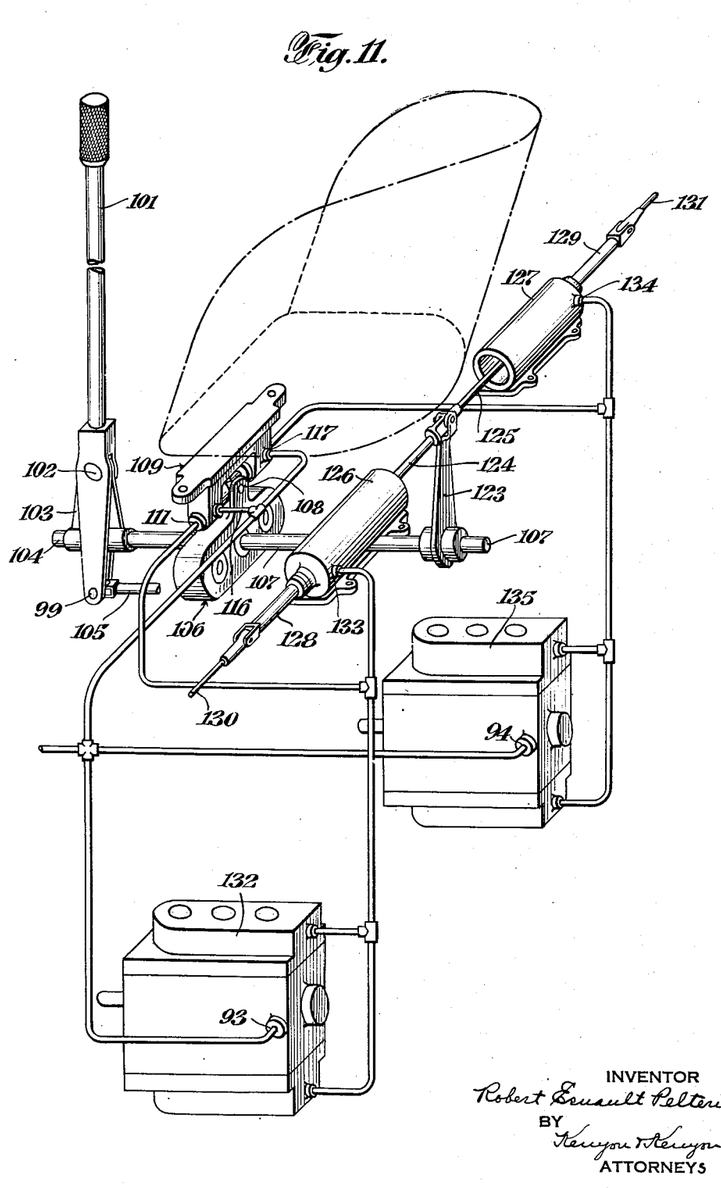
Figure 11 is a schematic perspective view of the general arrangement of another form of control apparatus suitable for controlling the transverse equilibrium (ailerons or warping) of a large aeroplane.
Figures 12, 13:
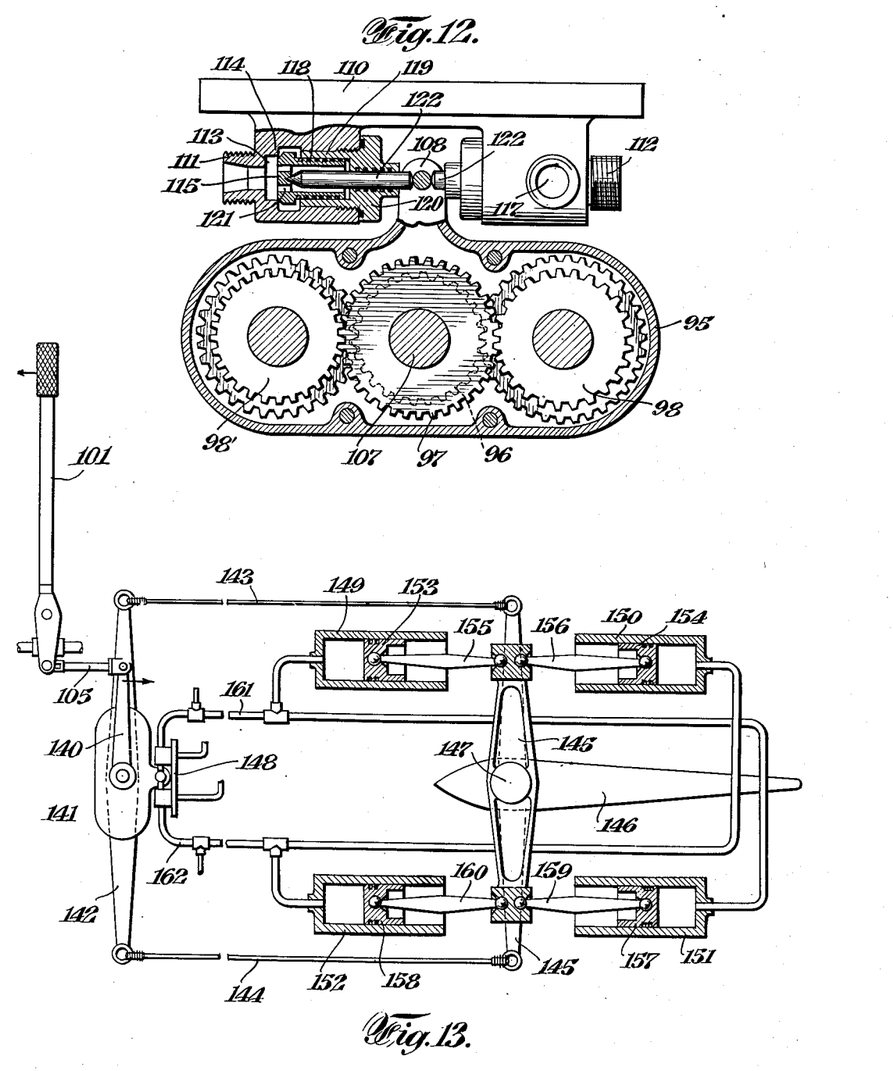
Figure 12 is a detail partly in sectional elevation of a valve relay device forming part of the system shown in Figure 11.
Figure 13 is a schematic view in elevation of a modified system as applied to the control of the longitudinal equilibrium of an aeroplane.

A further modification of this invention is shown in Figs. 11 and 12, this modification being especially suitable for handling heavy vehicles and is illustrated in connection with an aeroplane control system.

In Figure 11, 101 indicates a joy-stick which could, if desired, be replaced by a wheel mounted on the top of a longitudinally movable lever. The joy-stick 101 is pivoted about a transverse pivot 102 carried by a bracket 103 rigidly mounted on a longitudinal shaft 104. The shaft 104 is journalled in bearings (not shown) mounted on the body of the aeroplane so that the joy-stick may be oscillated transversely about the axis of the shaft 104 to control the transverse equilibrium, and longitudinally about the axis of the pivot 102 to control the longitudinal equilibrium. The lower end of the joy-stick is articulated at pivot 99 to a link 105 controlling the servo system shown in Figure 13, as will be presently described.

The shaft 104 enters an epicylic gear train indicated generally by the reference character 106 of the kind described in Figs. 8 and 9. In this gear train pinions 96 and 97 of slightly different diameter fixedly mounted on the end of the shaft 104 and on the end of a co-axially arranged shaft 107 respectively mesh with sets 98, 98' of planetary pinions, the pinions of each set being rigidly mounted for rotation together on a shaft journalled in the casing box or support 95. In consequence of the transmission ratio other than unity thereby produced between the shafts 104 and 107 the support 95 for the gear train 106 tends to rotate in the one direction or the other relatively to the shaft 104 according to whether the transmission ratio is greater or less than unity. In the arrangement shown in Figure 12 the gearing is such that the shaft 107 rotates slightly slower than the shaft 104. The epicylic gear train 106 therefor tends to rotate in the opposite direction to the shaft 104 and by means of an arm 108 acts on a valve relay device indicated generally by 109 and shown in greater detail in Figure 12.

The valve relay device comprises a body portion 110 provided with pipe-connection unions 111 and 112 leading to valve chambers 113. Each valve chamber is provided with an annular seating 114 adapted to be engaged by a valve member 115. On the low-pressure side of the valve members 115 the chambers 113 communicate with outlet pipe-connection unions 116 and 117. On the low-pressure side the valve members 115 are provided with hollow cylindrical extensions 118 sliding in cylinders 119 formed in screw plugs 120 closing the ends of the chambers 113. The cylinders or chambers 119 are in communication with the high-pressure sides of the valves 115 through openings 121 in the valve heads. In order to improve the liquid seal between the pistons 118 and their cylinders 119 the former may be provided with small open grooves in the known manner. The valves are operated from the arm 108 of the epicylic gear train through pointed rods 122 engaging conical recesses in the valve heads. The rods 122 are of such length that in the central position of the arm 108 both valves are open sufficiently to relieve substantially the pressure on their high-pressure sides.

As shown in Figure 11, the shaft 107 extending from the epicylic gear train carries an arm 123 to the upper end of which are articulated connecting rods 124, 125 pertaining to single-acting hydraulic servo-motor cylinders 126, 127. The pistons (not shown) of these cylinders also have piston rods 128, 129 extending through glands in the closed ends of the cylinders and connected to cables 130, 131 leading to the ailerons or warping mechanism to be operated. While one hydraulic servo-power device is used for actuating the control of the vehicle in one direction and another independent one is used for actuating the control of the vehicle in the opposite direction, it is apparent that a double-acting piston similarly comprises two uni-directional servo-power devices and operates in an equivalent way.

The epicyclic gear train, the valve relay device and the servo-power cylinders may be arranged by way of example to lie in a horizontal position under the pilot's seat shown in dotted lines. The epicyclic gear train, movement of which is limited by the arm 108, is part of a manually-operable force applying system for the controls and the support for the gear train is in effect a lost motion member.

Operating liquid is supplied by a pump 132 to a pipe-connection union 133 pertaining to the cylinder 126 and to the union 111 pertaining to the valve device 109. Similarly, operating liquid is supplied to a union 134 pertaining to the cylinder 127 and to the valve device union 112 by a pump 135. The outlet pipe-connection unions 116 and 117 of the valve device are connected to the suction inlet connections 93 and 94 of the pumps 132 and 135 respectively.

If, for example, the joy-stick 101 is moved by the pilot towards the right, the shaft 104 rotates in a clockwise direction (looking forwards) and the epicyclic gear 106 tends to move in the opposite direction. The arm 108 acts through the rod 122 upon the left-hand valve 115 so that a pressure builds up on the high pressure side of this valve which is substantially proportional to the pressure exerted by the arm 108 and this pressure is substantially proportional to the force applied by the operator to the joy-stick. Owing to the fact that the cylinder or chamber 119 is in communication with the high-pressure side of the valve, the mechanical pressure exerted by the arm 108 is less than the product of the fluid pressure and the area bounded by the valve seat 114 and is in fact equal to the product of the fluid pressure and the difference between the said area and the cross-sectional area of the cylinder 119. By this arrangement it is possible to control large volumes of liquid at high pressures without requiring excessive mechanical reduction ratios or control movements of large amplitude, either of which would impair the accuracy and convenience of the system. The pressure which builds up on the high-pressure side of the left-hand valve is transmitted to the servo-motor cylinder 126 where it becomes operative to assist the movement of the cable 130 towards the right.

In Figure 13 the link 105 from the lower end of the joy-stick 101 is connected to a lever 140 mounted on one of the shafts of an epicyclic gear train 141 of similar construction to that of the gear train 106 shown in Figure 12. The other shaft of the epicyclic gear carries a double-armed lever 142 to the upper and lower ends of which are connected cables 143, 144 connected at their other ends to the upper and lower ends of a lever 145 fixed to the elevator 146 which is pivotally mounted upon a shaft 147. In the same way as in Figure 12, the epicyclic gear train 141 actuates a valve relay device 148 similar to the device 109 controlling the liquid pressures operative in servo-motor cylinders 149, 150, 151 and 152. The pistons 153 and 154 pertaining to the cylinders 149 and 150 are connected to the upper arm of the lever 145 by rods 155 and 156 and similarly the pistons 157 and 158 of the lower cylinders are connected by rods 159 and 160 to the lower arm of the lever 145. From the upper chamber of the valve device 148 a conduit 161 leads to a pump (not shown) and to the servo-motor cylinders 149 and 151. The servo-motor cylinders 150 and 152 and a second pump are similarly connected by a conduit 162 to the lower chamber of the valve device 148 so that the system operates in a manner identical with that of Figure 11.

In this construction it will be seen that instead of the power of the servo-motor being transmitted by cables from a point near the pilot's seat to the member controlled, this distance is covered by the transmission of the pressure medium through the pipes 161 and 162 so that large mechanical forces only become operative in the vicinity of the said member. The purpose of this disposition is to avoid submitting the whole length of the fuselage of the aeroplane to these large forces, which are so much the greater in that the cables, being only able to work under tension, would require a substantial initial tension. On the other hand, the pressure medium conduits 161 and 162 may constitute framing elements of the fuselage.

With the conduits 161 and 162 connected to the valve device 148, as shown, the epicyclic gearing train 141 must be so arranged that the lever 140 moves through a greater angle than the lever 142. Conversely, if the gearing is such that the lever 142 moves through the greater angle, the connections of the conduits 161 and 162 should be interchanged.

A further modification of this invention is shown in connection with a motor vehicle steering system in Figs. 14 to 17. The steering handwheel 201 is connected through a column 202 to the larger central pinion 203 (Figure 15) of an epicyclic gear-box (indicated generally by 204) comprising co-axially mounted central pinions 203 and 205 of different diameters meshing with two sets of planetary pinions each comprising pinions 206 and 207 of different diameters rigidly connected together. The smaller central pinion 205 is rigidly connected by shaft 90 to a worm 208 meshing with a worm wheel 209 secured to the shaft of the drop arm 210. The drop arm 210 is connected through the usual drag link 211 to the steering road wheels indicated at 212. The casing 213 of the epicylic gear 204 comprises a projection 214 which engages the valve device presently to be described so that the casing is prevented from rotating. Under these circumstances it will be understood that upon rotating the handwheel 201 the worm 208 is rotated in the same direction but through a greater angle and the casing 213 tends to rotate in the same direction.

At an intermediate point between its ends the drop arm 210 carries a stub-axle 215 (Fig. 17) on which is rotatably mounted a roller 216 located in a slot 217 formed in a crosshead 218 sliding in guides 219. The crosshead 218 is connected by rods 220, 221 to the pistons 222, 223 of hydraulic cylinders 224, 225, provided with couplings 226, 227 for liquid supply pipes leading to the couplings 228, 229, respectively, of the control valve system shown in Figure 15.

The control valve system comprises a main body composed of the three parts 230, 231 and 232 all rigidly connected together and to the casing 233 enclosing the epicylic gear-box 204. The two sides of the valve device are symmetrical and comprise three chambers 234, 235, 236, and 237, 238 and 239 respectively. Between the chambers 234, 235 and 236 are valve seats 240 and 241 and similarly valve seats 242, 243 are located between the chambers 237, 238 and 239. Pressure controlling valves 244, 245 cooperate with the valve seats 240 and 242 respectively and have stem portions 246, 247 passing through bores in the body part 230. The ends of the stem portions abut against the projection 214 of the epicylic gear casing 213 and the length of the stems is such that when the projection 214 is in its central position both the valves 244, 245 are open sufficiently to allow the output from the pump to be discharged through the pipes 248, 249 leading from the chambers 234, 237 without building up substantial pressure in the chambers 235, 238. The working liquid is supplied from the pump through pipes 250, 251 into the chambers 236, 239.

Valves 252, 253 cooperate with the seatings 241, 243 between the outer pairs of chambers and have outwardly projecting stem portions 254, 255 sliding in sleeves mounted in the body portions 231, 232. Any liquid escaping past the stem portions is returned to the reservoir of the system through the pipes 256, 257. The relative diameters of the valve heads and the stem portions determines the degree to which the valves 252, 253 are balanced in respect of the pressure of the liquid in the chambers 236, 239, such balancing being effected according to principles presently to be described. The valves 252, 253 also have inwardly projecting stem portions 258, 259 the inner ends of which engage the valves 244, 245 so that when one or other of the latter is closed the corresponding valve 252 or 253 is opened. The length of the stem portions 258, 259 is such that when the projection 214 is in its middle position the valves 252, 253 are raised from their seats by an amount somewhat less than the amount by which the valves 244, 245 are opened.

The steering system operates in the following manner. Supposing the hand-wheel 201 to be turned in an anti-clockwise direction, the resistance to turning offered by the road wheels 212 results, as already explained, in a tendency for the casing 213 of the epicyclic gear train to turn the box 204 anti-clockwise. The projection 214 thus bears upon the stem 246 of the pressure-controlling valve 244 so that this valve moves towards its seat against the flow of liquid passing from the chamber 235 into the return pipe

248. At the same time the valve 245 opens further, while the valve 253 is thereby permitted to move towards its seat under the action of the liquid entering through the pipe 251. The flow of liquid into the chamber 238 is therefore restricted or shut off according to the extent of the movement of the projection 244. As already pointed out the construction is such that the valve 253 closes upon its seat while the valve 244 still remains open to some extent. Since the escape of the liquid past the valves 244 and 253 is hindered, the pressure rises in the pipes 250 and 251 and in the chambers 235 and 236. The valve 252, being opened more widely, does not obstruct the flow of the liquid. Owing to the increased pressure in the chamber 235 liquid flows out through the pipe connected at 228 into the hydraulic cylinder 224 at 226 and drives the piston 222 towards the right, thus assisting the force transmitted through the worm 208 and the worm wheel 209 and effecting the desired turning of the road wheels for steering towards the left. When the hand-wheel is turned in the clockwise direction the operation is similar, the valves 245 and 252 moving towards their seats and increased pressure thus being produced in the hydraulic cylinder 225.

In order that the valves 252, 253 shall provide when open at least as large, and preferably even larger, a passageway as the valves 244, 245 having the greater lift they are made of larger diameter than the latter. Since it is necessary for the proper operation of the device that in the mean position the force tending to close the valves 252, 253 should not be greater than the force tending to open the valves 244, 245, it is necessary to reduce the areas of the valves 252, 253 which are subjected to the pressure of the liquid in the chambers 236, 239. This is effected, as already mentioned, by providing stem portions 254, 255 of suitable diameter. In practice it is found satisfactory for the valves 252, 253 to have a lift in the mean position equal to half that of the pressure controlling valves 244, 245, and to have a differential section about a half or a third of the total section of the valves 244, 245.

As will be seen, in this arrangement the valves 252, 253 are controlled together by the movements of the casing 213 of the epicyclic gear train forming part of the manual force applying system and together constitute a change-over valve device whereby, when a force is transmitted through the system the discharge of the pump into the conduit in which the pressure is not to be increased is restricted or shut off.

A further construction of a controlling valve arrangement according to the invention is shown as included in a servo-assisted control system for the elevator of an aircraft in Figures 18 to 23.

Figure 18:
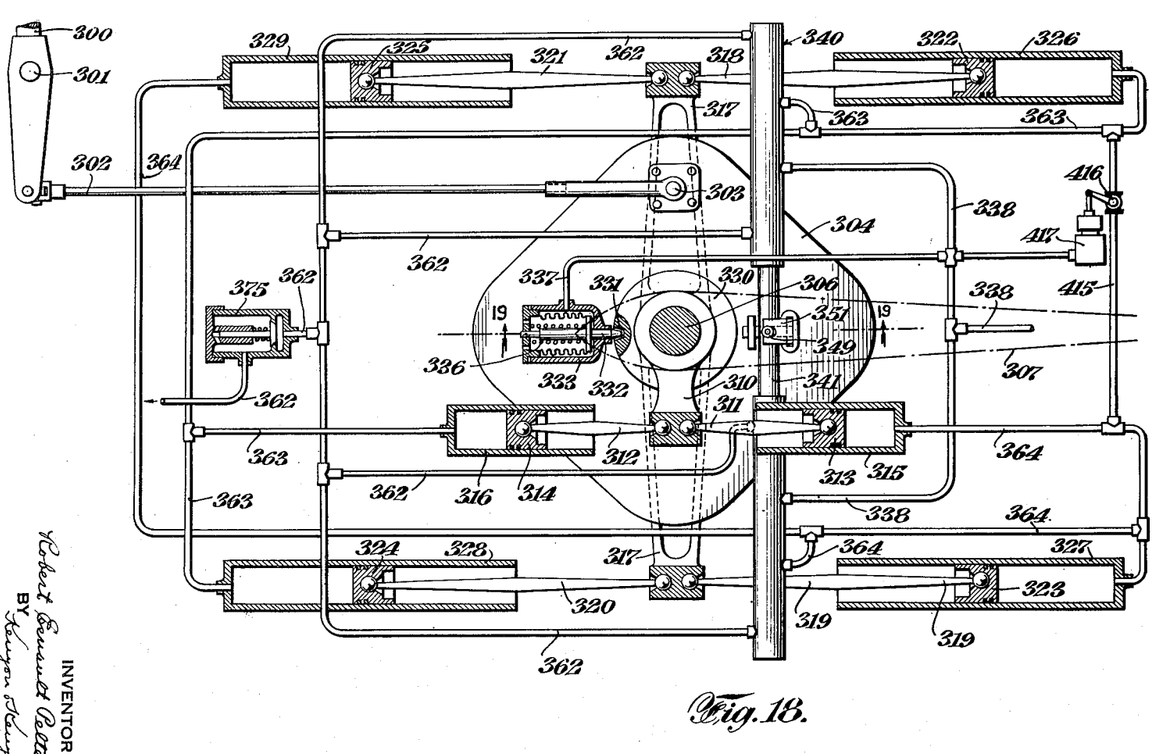
Figure 18 shows in side elevation and partly in section a servo-assisted control system for an elevator of an aeroplane.
Figures 20, 21, 22, 23:
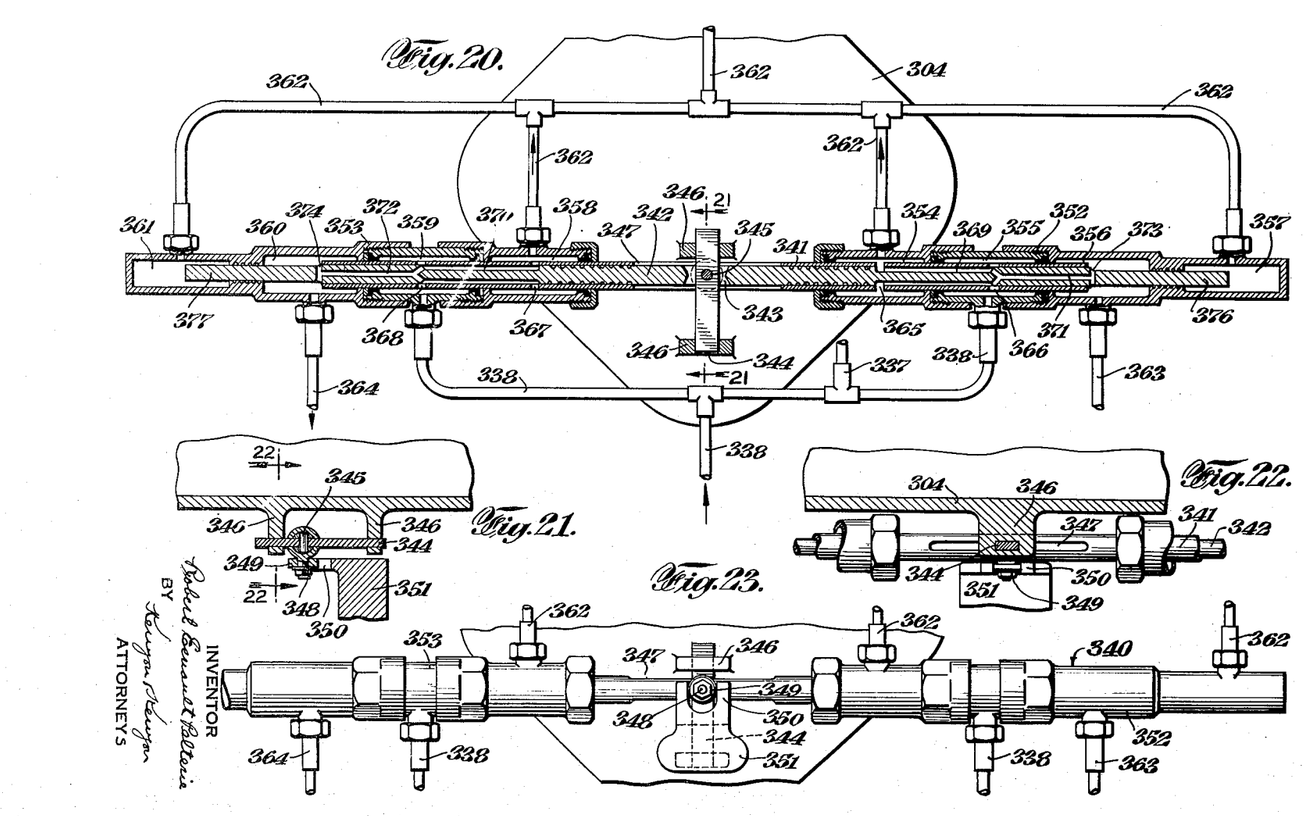
Figure 20 is a section through the control valve system.
Figure 21 is a fragmentary section along the line 21—21 in Figure 20.
Figure 22 is a fragmentary section along the line 22—22 in Figure 21.
Figure 23 is an elevation of the control valve system shown in Figure 20.

In Figure 18, a hand lever 300 is pivoted at 301 and connected at its lower end to a rod 302. The other end of the rod 302 is connected at 303 to the casing 304 of an epicyclic gear train which is of similar construction to the gear train 204 described with reference to Figure 15 except that it has four sets of planetary pinions instead of only two. The larger central pinion 305 is rigidly mounted on the shaft 306 of the elevator 307. The smaller central pinion 308 is rigidly connected to a sleeve 309 rotatable upon the shaft 306 and having a projecting arm 310, the free end of which is connected by rods 311, 312 to the pistons 313, 314 of hydraulic cylinders 315, 316. The elevator shaft 306 has a double armed lever 317 secured to it, the ends of the lever being connected by rods 318, 319, 320 and 321 to the pistons 322, 323, 324 and 325 of hydraulic cylinders 326, 327, 328 and 329.

The sleeve 309 is provided with a collar 330 having a recess 331 in its periphery into which a locking pin 332 is adapted to project. The locking pin 332 is slidably mounted in the wall of a casing 333 in the interior of which it is connected to a plate 334 forming the end member of a bellows 335. A spring 336 engages behind the plate 334 and thus drives the pin outwardly for engagement with the recess 331. The interior of the casing 333 is connected by a pipe 337 to a pipe 338 coming from the outlet of the supply pump of the system (not shown) and the spring 336 is of such strength that under all normal operating conditions the pressure of the liquid supplied by the pump is sufficient to collapse the bellows and thus maintain the pin 332 withdrawn from the recess 331. The air within the bellows may be permitted to escape through holes 339. In the event of loss of working pressure for any reason the pin 332 is moved outwardly by the spring 336 and engages the recess 331 as the sleeve 309 returns to its mean position, such return occurring in a manner presently to be described.

Assuming that the sleeve 309 has been locked in its mean position in this way, and that the pistons of the hydraulic cylinders 326, 327, 328 and 329 are free to move, it will be seen that the elevator 307 can be operated manually by means of the hand lever 300, the epicyclic gear train acting as a reduction gearing system. The transmission ratio of the gearing is determined by the relative diameters of the pinions 305, 308 and may be chosen to provide the optimum conditions for hand operation. For hand operation an increased range of movement of the hand lever and a somewhat reduced range of movement of the elevator can be tolerated in the interest of reducing the effort required from the operator. To effect the maximum economy of weight, the dimensions of the parts of the epicyclic gear are determined by the forces to be transmitted during manual operation, and during normal power-assisted operation only part of the servo power is transmitted through the gear, namely the forces developed in the hydraulic cylinders 315, 316. The remaining part of the servo power, which is developed in the cylinders 326, 327, 328 and 329, is applied directly to the elevator shaft 306. The supply of working liquid to all the hydraulic cylinders is controlled in common by a valve device indicated generally by the reference numeral 340 in Figs. 18 and 23 and shown in section in Fig. 20.

The valve device comprises a sleeve 341 sliding upon a rod 342. At its center the rod is provided with a slot 343 through which extends a flat bar 344 pivotally connected to the rod at 345. The bar 344 is slidably mounted in brackets 346 projecting from the casing 304 of the epicyclic gear train so that as the latter turns about the shaft 306 the rod 342 is moved in the direction of its axis, the bar 344 at the same time sliding in the brackets 346. The sleeve 341 is provided at its central portion with a slot 347 for the passage of the bar 344 of such length that the sleeve may remain stationary throughout the desired range of movement of the epicyclic gear casing. At its center the sleeve 341 is provided with a projecting pin 348 on which is mounted a roller 349 engaged between the arms 350 of a bracket 351 secured to the elevator 307. Consequently, when the elevator turns about its shaft 306 the sleeve 341 is moved axially a corresponding amount. The end portions of the sleeve 341 and rod 342 project into fixed closed casings 352, 353 each comprising four separate chambers 354, 355, 356, 357 and 358, 359, 360, 361, respectively. The two outer chambers of each group, namely, 354, 357, 358 and 361, are connected by pipes 362 through a spring-loaded valve 375 to the liquid reservoir of the system (not shown). The chambers 355 and 359 are connected to the pipe 338 coming from the outlet of the supply pump of the system. The chamber 356 is connected by a pipe 363 to the hydraulic cylinders 326, 328, and 316 and the chamber 360 by a pipe 364 to the hydraulic cylinders 315, 327 and 329. The sleeve 341 extends through the inner two chambers 354, 355 and 358, 359 of each group into the third chamber 356, 360, while the rod 342 extends through the third chambers into the outer chambers 357, 361. In the chambers 354, 355, 358 and 359 the sleeve 341 is provided with ports 365, 366, 367 and 368 respectively, the lengths of the chambers being such that the ports remain therein throughout the desired range of movement of the elevator 307. The length of the chambers 356, 360 is similarly determined by the extent of the movement of the ends of the sleeve 341, while the length of the outer chambers 357, 361 depends upon the range of movement of the epicyclic gear casing 304 under manual operating conditions.

The rod 342 has recesses 369, 370 which, when the middle points of the rod and sleeve are coincident, extend from the inner edges of the ports 365, 367 to about the centers of the ports 366, 368. From these recesses bores 371, 372 lead through the rod to ports 373, 374 opening adjacent the ends of the sleeve 341. The end portions 376, 377 of the rod 342 which project into the chambers 357, 361 are of smaller diameter than the portions within the adjacent chambers 356, 360 so that the pressure of the liquid in these latter chambers acts only on an area equal to the difference between the cross-sectional areas of these rod portions. Since, during power-assisted operation the resistance felt by the operator originates partly from the reaction of the epicyclic gear casing 304 to the driving effort of the piston 313 or 314 and partly from the pressure of the working liquid on one end of the rod 341, this resistance can be varied within limits by suitably choosing the diameter of the end portions 376, 377 of the rod and without varying the power of the pistons 313, 314 from the most economical value for full utilization of the epicyclic gear train.

The system operates normally in the following manner. Assuming that the operator moves the hand lever 300 towards the left, the gear casing 304 moves a little in the clockwise direction relatively to the elevator 307. The valve rod 342 operatively connected to the casing 304 by the sliding bar 344 therefore moves towards the left in Figure 20 relatively to the sleeve 341, thus closing the ports 366, partly closing the ports 367 and opening the ports 368 more widely. Owing to the closing of the ports 366 the whole of the liquid discharged by the pump flows into the chamber 359 and its pressure therein increases because its escape through the ports 368, recess 370, ports 367, chamber 358 and pipe 362 back to the reservoir is restricted by the partial closing of the ports 367. The liquid therefore flows through the bore 372, ports 374, chamber 360, pipes 364 to the hydraulic cylinders 315, 327 and 329 where it acts upon the pistons 313, 323 and 325 to assist the movement of the elevator 307 in a clockwise direction. Such movement causes the sleeve 341 to be moved to the left in Figure 20 relatively to the rod 342 so that the ports 367 are opened a little, the various parts finally coming to rest in such positions that the forces produced in the hydraulic cylinders by the throttling action at the ports 367, the effort exerted by the operator and the air pressure on the elevator are in equilibrium. If the operator then allows the hand lever 300 to return towards its mean position, the casing 304 turns in an anti-clockwise direction, the rod 342 moves to the right in Fig. 20 relatively to the sleeve 341 and the ports 367 are accordingly opened a little more so that the pressure in the hydraulic cylinders 315, 327 and 329 falls and the elevator, which is at least partly unbalanced, for a reason which will presently appear, returns towards its mean position under the action of the air pressures to which it is subjected. If the operator applies to the hand lever 300 an effort to the right, the system operates in a corresponding manner in the other direction, that is to say the middle point of the rod 342 moves to the right of the middle point of the sleeve 341, with the result that the ports 368 are closed and the escape through the ports 365 is throttled. The pressure accordingly rises in the chamber 356 and the hydraulic cylinders 326, 325 and 316 become operative so that the movement of the elevator in the anti-clockwise direction is assisted.

Figures 14, 15:
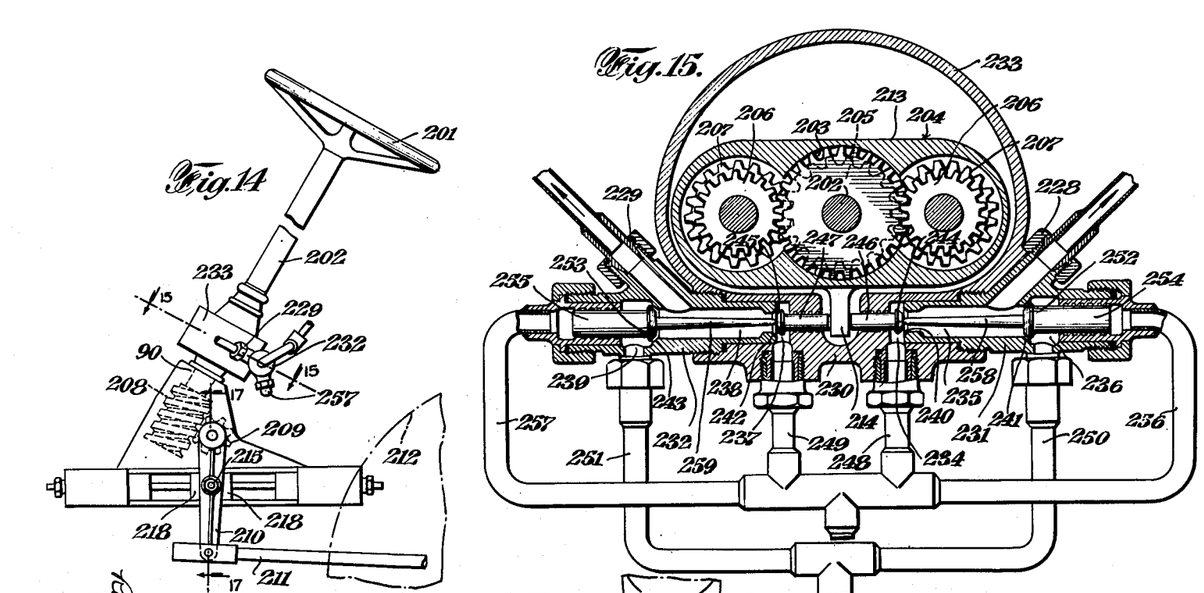
Figure 14 is a side elevation of the main parts of a servo-assisted steering system for a motor vehicle.
Figure 15 is a section through a modified type of control valve system along the line 15—15 in Figure 14.
Figure 16:
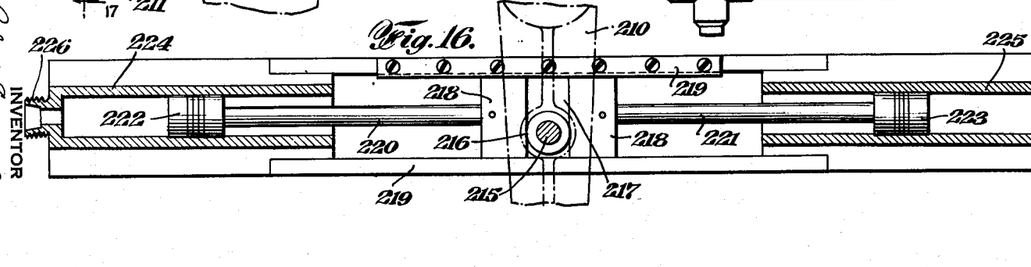
Figure 16 is a longitudinal section through the cylinders of the servo-power device shown in Figure 14.
Figures 17, 19:
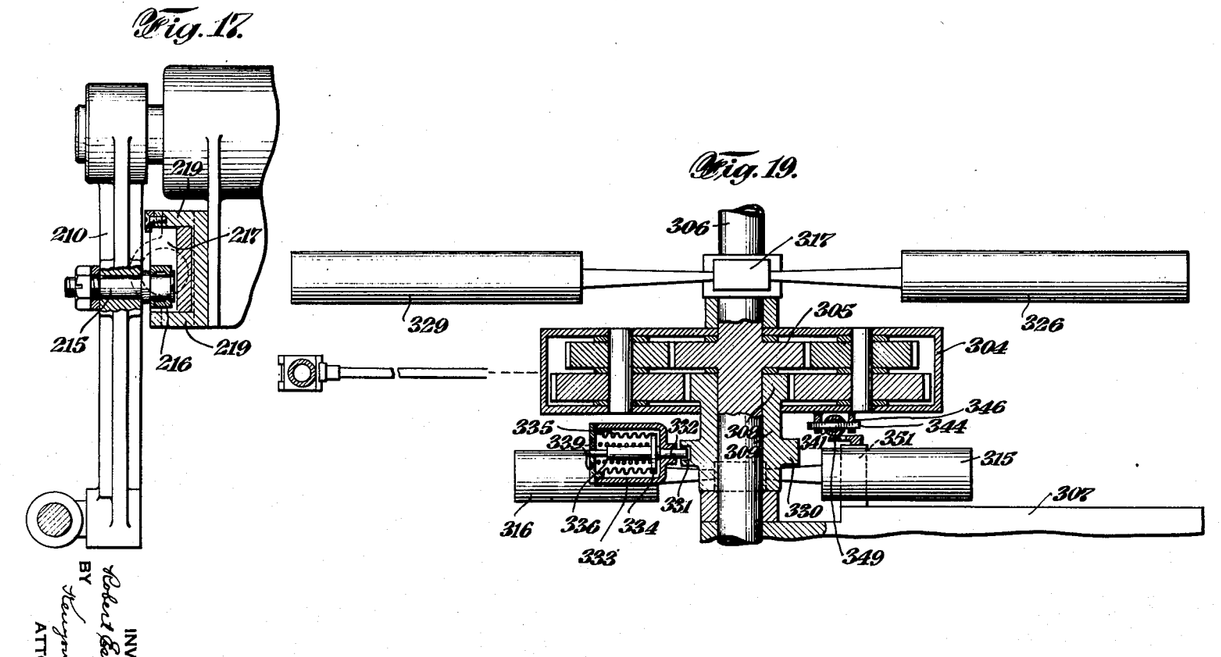
Figure 17 is a fragmentary end elevation partly in section along the line 17—17 in Figure 14.
Figure 19 is a section along the line 19—19 in Figure 18.

It will be observed that the ports 365, 367 in cooperation with the ends of the recesses 369, 370 perform the same function as the valves 244, 245 of the construction shown in Fig. 15, that is to say, they act as pressure-controlling valves by throttling the escape of liquid through branches from the conduits supplying the working liquid to the servo power device. Similarly, the ports 366, 368 in cooperation with the other ends of the recesses 369, 370 correspond to the valves 252, 253 and constitute a change-over device whereby the discharge of the pump into the conduit in which the pressure is not to be increased is restricted or shut off. The valve system shown in Fig. 20 differs however from that of Fig. 15—in that it does not limit the movement of the casing 304 to the range required during normal power-assisted operation, but permits it to move through a much greater range when, owing to failure of the power supply, the system is to be operated by hand alone. Other constructions are of course possible for securing the same result, for example, in a construction such as that shown in Fig. 15 the projection 214 could be made withdrawable by a device responsive to failure of the power supply, or the valves might be operated through resilient means which are sufficiently stiff to transmit the forces occurring during power-assisted operation but yield during manual operation.

As appears from the preceding description, all the hydraulic cylinders are controlled in common by the valve device 340, but for the purpose of explaining the operation in changing from power-assisted to manual working the effect of the cylinders 326, 327, 328 and 329 acting directly upon the elevator shaft may be ignored, except to note that all the cylinders are preferably provided with means ensuring the free movement of the pistons when the power supply fails. Such means may constitute for example a by-pass between 415 each pair of opposed cylinders controlled by a valve 416 which opens when the operating pressure falls below a predetermined minimum by virtue of some suitable means 417 connected with the liquid supply conduit that is adapted to open the valve 416 responsive to failure of the liquid supply. Similarly controlled by-passes may alternatively be provided between the pipes 363, 364 and the reservoir of the system. The spring-loaded valve 375 in the discharge pipe 362 ensures that during normal operation a sufficient pressure is maintained in the system to maintain the by-pass valves closed and the locking pin 332 retracted. Alternatively, the same result can be obtained by employing ports of suitable diameter in the control valve device 340.

During normal power-assisted operation the epicyclic gear train operates in the manner of a balance beam to different points of which are applied the manual force from the hand lever 300, the force exerted by the pistons 313, 314 and the resistance to movement of the elevator 307. In some constructions the epicyclic gear train or other differential device may in fact be replaced by a simple balance lever in the manner shown, for example, in Figure 6 of the drawings accompanying my application Serial No. 276,250 referred to below. For example (Fig. 24) the rod 302 may be connected to the upper end of a lever 494 which pivots about pin 493 fixed to the upper end of a lever 492 that is fixed to rotatable shaft 491 to which the elevator 490 is fixed. A connecting rod 495 is connected to the lower end of lever 494 by a ball and socket joint 504. The other end of rod 495 is connected by a ball and socket joint 505 to the end of a threaded rod 496 about which is arranged an internally threaded nut 497 rotatably mounted between stationary supports 498. The nut 497 can be operated by any suitable servo-power device (not shown) such as a device of the type shown in Figure 6. It is apparent that the lever 494 is balanced about the pin 493 and that a force necessary to actuate the elevator is proportionally borne by the operator through rod 302 and by the servo-power device when this device is operating. The servo-power device can be actuated through a valve relay device such as that shown in Figures 18 and 20, for example. The rod 342 of this device is actuable by the arm 503 attached to the lower end of the lever 494 and by the pin 501 that is attached to the rod 342 and is slidable in slot 518. The sleeve 341 is operated by a forked bracket 506 attached to lever 492 adapted to cooperate with lug 508 and roller 509 attached thereto. The rod 342 and sleeve 341 are slidable in the casing 352 of the valve relay device shown in Figures 18 and 20 which acts precisely in the way previously described responsive to establishment of equilibrium and disequilibrium of levers 492 and 494 about the pin 493. In normal operation the levers 492 and 494 are maintained approximately in alignment by the action of the servo-power device responsive to the valve relay device.

Figures 24, 25, 26, 27:
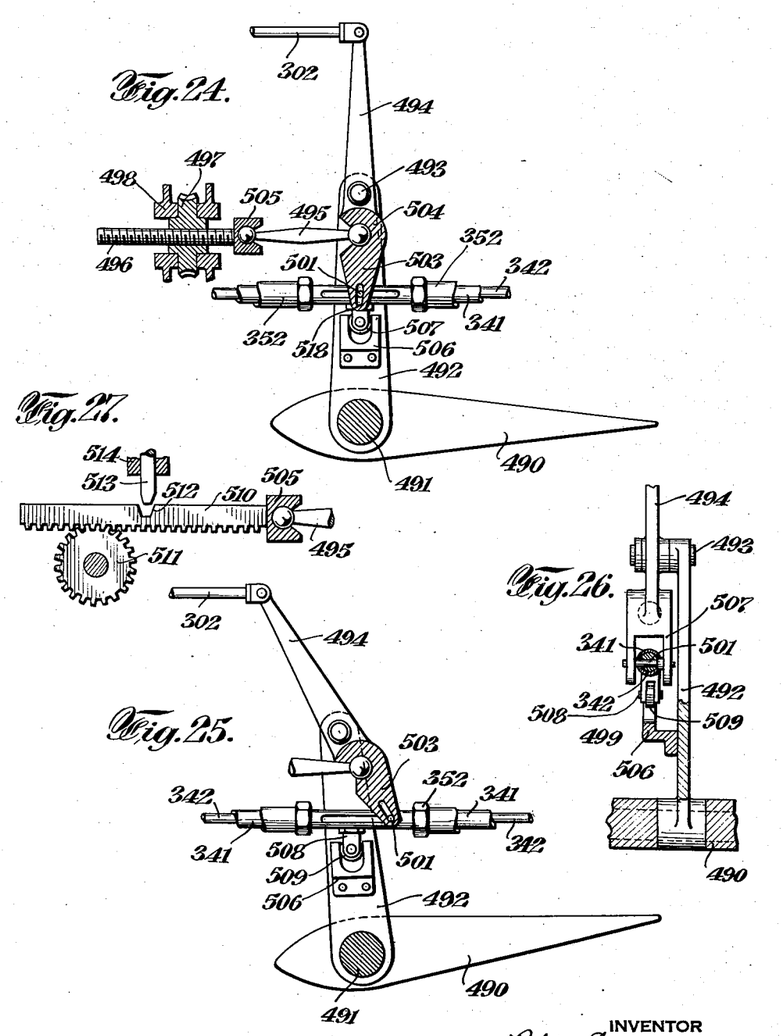
Figure 24 is a side elevation with a part in section of a modified device embodying this invention employing a lever system.
Figure 25 is a view of the apparatus shown in Figure 24 with the parts in a different position.
Figure 26 is an end elevation partly in section of the device shown in Figures 24 and 25.
Figure 27 is a detail view of modified means for connecting the servo-power device to the lever system shown in Figures 24 to 26.

In the event of power failure the rod 496 remains locked in position and the ball and socket joint 504 becomes a fixed fulcrum for the lever system. In such case the lever 494 can still be manipulated by the operator and its movement will be transmitted to a lesser degree and with a high degree of leverage in favor of the operator to the lever 492, the shaft 491 and the elevator 490. In Figure 25 the lever system is shown in a position wherein the elevator is moved solely by manual operation of the rod 302 to bring the levers substantially out of alignment and thereby actuate the control 490. As above explained, the slidable rod and sleeve valve relay arrangement permits this non-normal extended movement of lever 494 relative to the lever 492. Instead of having the ball and socket joint stop wherever it may be located at the time of the failure of power supplying the servo-power device, means may be provided for permitting the elevator 490 to return to mean position before the ball and socket joint 504 is fixed in position. For example, the rod 495 may be fixed to a reversible rack 510 (Fig. 27) and servo-power driven gear 511 device and the rack 510 may have a notch 512 therein in which a pin 513 is adapted to be inserted when the lever 494 is in mean position. The pin 513 is normally held retracted (for example, after the manner of pin 331, see Fig. 18) but can be urged into notch 512 upon failure of power so that the pin 513, which is slidable in a stationary support 514, will hold the ball and socket joint 504 as a stationary fulcrum after the lever 494 has been returned to mean position.

Referring to Figs. 18 to 23, upon failure of the power supply, which will be assumed to occur while the elevator is in a displaced position, the pistons of all the hydraulic cylinders are rendered freely movable in the manner described and the locking pin 332 is pressed into contact with the periphery of the collar 330 by the spring 336. Movement of the gear casing 304 is opposed partly by its own inertia and partly by the action of the operator on the hand lever 300. The elevator 307 in returning towards its mean position under the action of the unbalanced air pressures acting upon it therefore effects the rotation of the sleeve 309 also towards its mean position, and inasmuch as the gear wheel 305 driven by the elevator is larger than the gear wheel 308 secured to the sleeve, the latter must reach its mean position before the elevator. As the sleeve reaches its mean position the locking pin 332 enters the recess 331 of the collar 330, so that the gear wheel 308 is now held fast. The locking of the gear wheel 308 in effect produces a new fixed fulcrum about which the equivalent balance beam continues to operate for controlling the elevator manually, the transmission ratio being greatly increased in favor of the operator. Considerably greater movements of the gear casing 304 therefore occur in these circumstances, but, as already pointed out the construction of the control valve device is such as to permit these movements to take place.

The return of the sleeve 309 to its mean position is effected for the purpose of ensuring that both during power-assisted operation and during manual operation the hand lever is movable about the same mean position, and it also requires a smaller range within which movements of the control casing 304 are not to be limited by the control valve device. In some constructions, for example, in which the control member is a hand wheel the rotation of which is limited only by the permissible movements of the driven member (elevator), these conditions will not apply, and the sleeve 309 or its equivalent may then be locked in the position in which they are situated when the failure occurs as by providing a plurality of notches 331 about the periphery of collar 330. Obviously, if the servo-power device acts upon the sleeve or its equivalent through an irreversible drive, such as a screw and nut mechanism, no additional locking means will be required.

The embodiments of this invention shown in the drawings above mentioned deal primarily with hydraulically operable servo-power devices. In my concurrently executed application, Serial No. 276,250 filed May 27, 1939, for Apparatus for controlling land, marine and aerial vehicles, my invention is illustrated in connection with servo-power devices primarily electrical in nature and the disclosure in said concurrent application is to be regarded as incorporated herein inasmuch as many of the devices and arrangements shown in the two applications are interchangeable. Thus, for example, it is to be understood that many features of this invention are not to be limited to systems utilizing hydraulic servo-power devices. Moreover, while this invention has been described in connection with specific embodiments thereof, it is to be understood that this has been done merely for the purpose of illustration and that the devices shown can be varied without departing from the scope of this invention as defined in the accompanying claims. It is also to be understood that the drawings are for the most part diagrammatic.

I claim:

1. Control apparatus for a land, marine, or aerial vehicle which comprises a control for the vehicle, a servo-power device arranged to actuate said control, a manually operable part, means responsive to movemnet of said part for actuating said servo-power device to actuate said control, and means for actuating said control responsive to movement of said manually operable part when there is failure of power supply for actuating said servo-power device, said last-named means being arranged so as to increase the leverage ratio in favor of the operator upon such failure and also so that a substantially greater extent of movement of said part is then required to effect a given extent of movement of said control than when said control is moved by said servo-power device.

2. Control apparatus for a land, marine, or aerial vehicle which comprises a control for the vehicle, a servo-power device arranged to actuate said control, a manually operable part, means responsive to movement of said part for actuating said servo-power device, means adapted to actuate said control responsive to manual operation of said part when there is failure of power normally supplied for actuating said servo-power device, and means responsive to such failure of power to increase the leverage ratio in favor of the operator and to render said part movable through a greater extent of movement than the extent of movement required to effect a corresponding movement of said control when power is available to said servo-power device whereby said favorable leverage ratio will aid said operator in operating said control when such failure of power supply occurs.

3. Control apparatus for a land, marine or aerial vehicle which comprises a control for the vehicle, a servo-power device, means including a movable member operatively connected to said control for actuating said control responsive to action of said servo-power device, a manually movable part, means for actuating said servo-power device responsive to movement of said part, means for moving said control responsive to movement of said part when said member is in fixed position, and means responsive to failure of power supply of said servo-power device for maintaining said member in fixed position.

4. Control apparatus for a land, marine, or aerial vehicle which comprises a control for the vehicle, a servo-power device arranged to actuate said control, a manually movable part, means responsive to movement of said part to actuate said servo-power device, and means including a by-pass valve directly responsive to failure of power supply for said servo-power device adapted to free said control so that it can return to its mean position.

5. Control apparatus according to claim 4 in which said by-pass valve directly responsive to failure of power supply for said servo-power device operatively disconnects said servo-power device from said control.

6. Control apparatus according to claim 4 which comprises means responsive to failure of power supply for said servo-power device for rendering the working parts of said servo-power device freely movable.

7. Control apparatus for a land, marine or aerial vehicle which comprises a control for the vehicle, a servo-power device arranged to actuate said control, a manually movable part, means responsive to movement of said part to actuate said servo-power device, means responsive to failure of power supply for said servo-power device adapted to free said control so that it can return to its mean position, connecting means for operatively connecting said control to said manually movable part after said control has returned to its mean position; and means responsive to continued power supply for preventing said connecting means from operatively connecting said control to said manually movable part.

8. In control apparatus for a land, marine or aerial vehicle the combination comprising a control for said vehicle, a movable member adapted to actuate said control, a servo-power device, a manually movable part, means for applying force from said servo-power device to said member so as to be balanced about a fulcrum with force applied by said manually movable part, means responsive to disequilibrium of said forces about said fulcrum to actuate said servo-power device to bring said forces into equilibrium, and means for maintaining the point where said servo-power is applied fixed when there is failure of supply of power to the servo-power device so that force applied to said manually operable part tends to move said fulcrum about said point to give increased mechanical leverage in favor of the operator for actuating said control responsive to movement of said manually operable part.

9. Control apparatus for a land, marine, or aerial vehicle which comprises a control for the vehicle, a servo-power device arranged to actuate said control, a manually operable part, means responsive to movement of said part for actuating said servo-power device to actuate said control, and means for actuating said control responsive to movement of said manually operable part when there is a failure of power supply for actuating said servo-power device, said last-named means comprising a train of gears, one of said gears being connected to said control, a second of said gears being connected to said servo-power device, and other gears of said train intermeshing with said two gears, and means for locking said second gear against rotation when said failure of power occurs, said last-named means being arranged so as to increase the leverage ratio in favor of the operator upon such failure and also so that a substantially greater extent of movement of said part is then required to effect a given extent of movement of said control than when said control is moved by said servo-power device.

10. Control apparatus for a land, marine, or aerial vehicle which comprises a control for the vehicle, a servo-power device arranged to actuate said control, a manually operable part, means responsive to movement of said part for actuating said servo-power device to actuate said control, and means for actuating said control responsive to movement of said manually operable part when there is a failure of power supply for actuating said servo-power device, said last-named means comprising a first lever pivotally connected adjacent one end to said manually movable part, a second lever rigidly connected to said control and pivotally connected to said first lever intermediate the ends thereof, and a link pivotally connected to said first lever adjacent its other end, and also pivotally connected to an element associated with said servo-power device, and means operating on said element for locking it and said link against longitudinal movement when said failure of power occurs, said actuating means being arranged so as to increase the leverage ratio in favor of the operator upon such failure and also so that a substantially greater extent of movement of said part is then required to effect a given extent of movement of said control than when said control is moved by said servo-power device.

11. Control apparatus for a land, marine or aerial vehicle, which comprises a control for the vehicle, a pressure actuated servo-power device arranged to actuate said control, a manually operable part, pressure controlling means for controlling pressure supply to said servo-power device to actuate said control, means responsive to movement of said part for actuating said pressure controlling means, means responsive to movement of said control tending to restore pressure equilibrium in said servo-power device when the control has moved to the extent intended to correspond to that of said manually movable part, and means for actuating said control responsive to movement of said manually operable part when there is failure of power supply for actuating said servo-power device, said last-named means being arranged so as to increase the leverage ratio in favor of the operator upon such failure and also so that a substantially greater extent of movement of said part is then required to effect a given extent of movement of said control than when said control is moved by said servo-power device.

12. Control apparatus for a land, marine or aerial vehicle which comprises a control for the vehicle, a hydraulic servo-power device arranged to actuate said control, a manually operable part, a pump arranged to supply fluid through a conduit to said servo-power device, valve means including relatively movable valve members movable co-axially one within the other for controlling fluid supply to said servo-power device, means responsive to movement of said part for moving one of said members relative to the other when the other member is in any one of a plurality of different positions to cause liquid pressure on said servo-power device to be increased, means responsive to movement of the control for moving said other of said members relatively to the first member for relieving pressure tending to actuate said servo-power device when said first-named member is in any one of a plurality of different positions, and means for actuating said control responsive to movement of said manually operable part when there is failure of power supply for actuating said servo-power device, said means being arranged so as to increase the leverage ratio in favor of the operator upon such failure and also so that a substantially greater extent of movement of said part is then required to effect a given extent of movement of said control than when said control is moved by said servo-power device.

13. Control apparatus for a land, marine or aerial vehicle which comprises a control for the vehicle, a first servo-power device, and a second servo-power device, means including a movable member operatively connected to said control and to said first servo-power device for actuating said control responsive to action of said first servo-power device, means directly connecting said second servo-power device to said control to assist in servo-power operation of said control, a manually movable part, means for actuating both said servo-power devices responsive to movement of said part, means for moving said control responsive to movement of said part when said member is in fixed position, means responsive to failure of power supply to said servo-power devices for maintaining said member in fixed position, and means responsive to failure of power supply to said servo-power devices adapted to free said control so that it can return to its mean position.

ROBERT ESNAULT-PELTERIE.